United States Patent [19]

Eakman et al.

[11] 4,118,204

[45] Oct. 3, 1978

[54] PROCESS FOR THE PRODUCTION OF AN INTERMEDIATE BTU GAS

[75] Inventors: James M. Eakman, Houston, Tex.; Nicholas C. Nahas, Morris Plains, N.J.; Charles A. Euker, Jr., Houston, Tex.

[73] Assignee: Exxon Research & Engineering Co., Linden, N.J.

[21] Appl. No.: 771,504

[22] Filed: Feb. 25, 1977

[51] Int. Cl.² .............................................. C01J 3/54
[52] U.S. Cl. .................... 48/197 R; 48/202; 48/214 A
[58] Field of Search .............. 48/197 R, 202, 206, 48/214 A

[56] References Cited

U.S. PATENT DOCUMENTS

| | | | |
|---|---|---|---|
| 3,004,839 | 10/1961 | Tornquist | 48/197 R |
| 3,115,394 | 12/1963 | Gorin et al. | 48/202 |
| 3,847,567 | 11/1974 | Kalina et al. | 48/202 |
| 3,929,431 | 12/1975 | Koh et al. | 48/197 R |

*Primary Examiner*—Robert L. Lindsay, Jr.
*Assistant Examiner*—Peter F. Kratz
*Attorney, Agent, or Firm*—Yale S. Finkle

[57] ABSTRACT

An intermediate Btu gas is produced by reacting steam with a carbonaceous feed material in the presence of a carbon-alkali metal catalyst and substantially equilibrium quantities of added hydrogen and carbon monoxide at a temperature between about 1000° and about 1500° F. and a pressure in excess of about 100 psia to produce a raw product gas consisting essentially of equilibrium quantities, at reaction temperature and pressure, of methane, steam, carbon dioxide, carbon monoxide and hydrogen; withdrawing the raw product gas from the gasifier and treating it for the removal of acid gases to produce a treated gas; withdrawing a portion of the treated gas as an intermediate Btu product gas; mixing the remainder of the treated gas with steam; passing the resultant mixture into a steam reforming furnace where the methane in the gas reacts with the steam to produce additional amounts of carbon monoxide and hydrogen; and passing the effluent from the reforming furnace into the gasifier.

13 Claims, 1 Drawing Figure

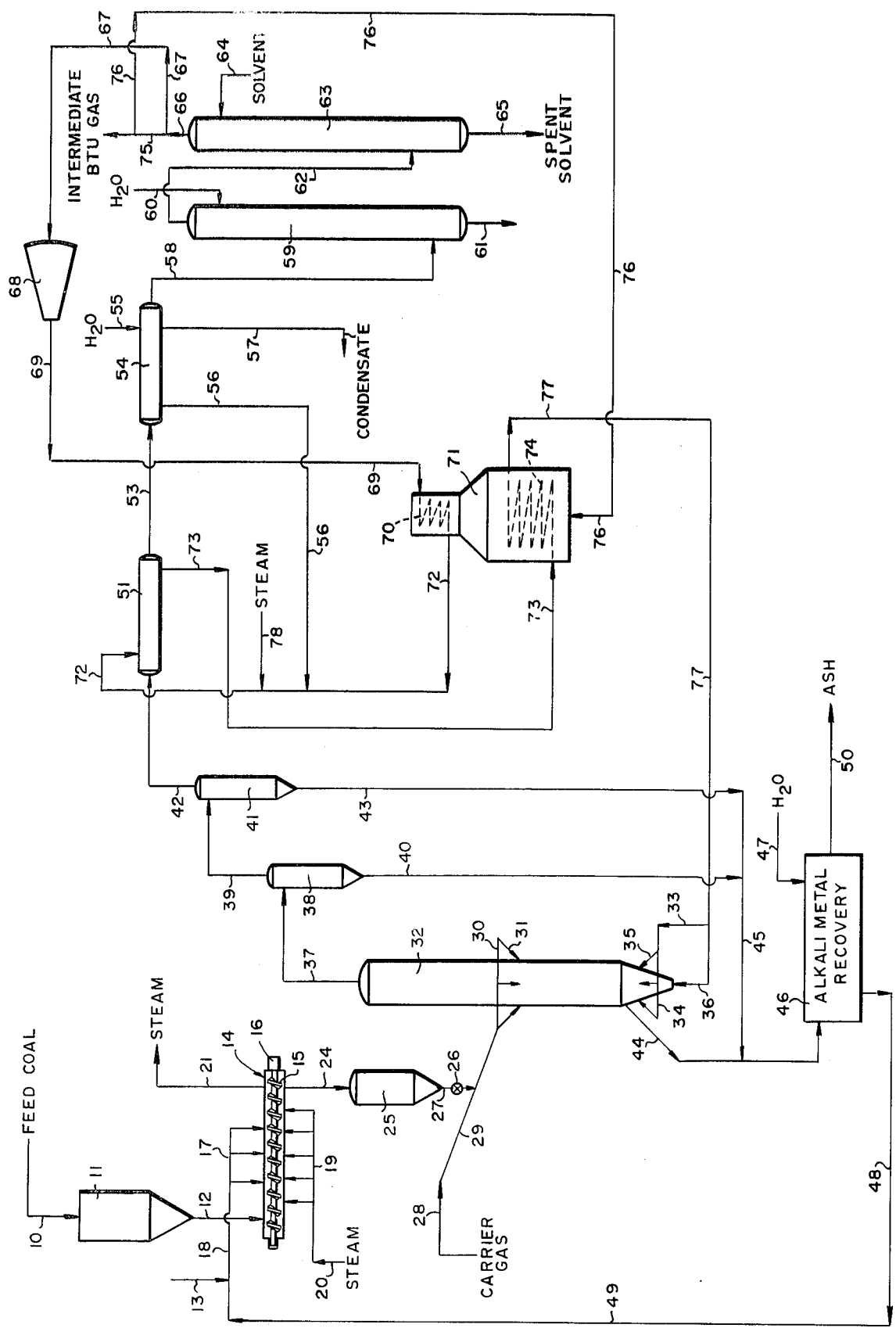

PROCESS FOR THE PRODUCTION OF AN INTERMEDIATE BTU GAS

BACKGROUND OF THE INVENTION

1. Field of the Invention

This invention relates to the gasification of coal and similar carbonaceous materials and is particularly concerned with a catalytic gasification process for producing an intermediate Btu gas carried out in the presence of a carbon-alkali metal catalyst.

2. Description of the Prior Art

Existing and proposed processes for the manufacture of synthetic gaseous fuels from coal or similar carbonaceous materials normally require the reaction of carbon with steam, alone or in combination with oxygen, at temperatures between about 1200° F. and about 2500° F. to produce a gas which may contain some methane but consists primarily of hydrogen and carbon monoxide. This gas can be used directly as a synthetic gas or a fuel gas with little added processing or can be reacted with additional steam to increase the hydrogen-to-carbon monoxide ratio and then fed to a catalytic methanation unit for reaction with carbon monoxide and hydrogen to produce methane. It has been shown that processes of this type can be improved by carrying out the initial gasification step in the presence of a catalyst containing an alkali metal constituent. The alkali metal constituent accelerates the steam-carbon gasification reaction and thus permits the generation of synthesis gas at somewhat lower temperatures than would otherwise be required. Processes of this type are costly because of the large quantities of heat that must be supplied to sustain the highly endothermic steam carbon reaction. One way of supplying this heat is to inject oxygen directly into the gasifier and burn a portion of the carbon in the feed material being gasified. This method is highly expensive in that it requires the existence of a plant to manufacture the oxygen. Other methods for supplying the heat have been suggested but these, like that of injecting oxygen, are expensive.

It has been recently found that difficulties associated with processes of the type described above can largely be avoided by carrying out the reaction of steam with carbon in the presence of a carbon-alkali metal catalyst and substantially equilibrium quantities of hydrogen and carbon monoxide. Laboratory work and pilot plant tests have shown that catalysts produced by the reaction of carbon and alkali metal compounds such as potassium carbonate to form carbon-alkali metal compounds or complexes will under the proper reaction conditions equilibrate the gas phase reactions occurring during gasification to produce additional methane and at the same time supply substantial amounts of additional exothermic heat within the gasifier. This additional exothermic heat of reaction essentially balances the overall endothermicity of the reactions involving solid carbon and the water-gas shift reaction and thus results in a substantially thermoneutral process in which the injection of large amounts of oxygen or the use of other expensive methods of supplying heat are eliminated.

The catalytic effect of carbon-alkali metal catalysts on the gas phase reactions, as distinguished from the solid-gas reactions or the reactions of carbon with steam, hydrogen or carbon dioxide, allows the following exothermic reactions to contribute substantially to the presence of methane in the effluent gas and drastically reduces the endothermicity of the overall reaction:

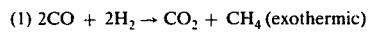

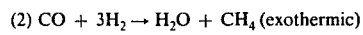

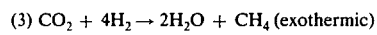

Under the proper operating conditions, these reactions can be made to take place within the gasification zone and supply large amounts of methane and additional exothermic heat which would otherwise have to be supplied by the injection of oxygen or other means. Laboratory and pilot plant tests have shown that constituents of the raw product gas thus produced are present in equilibrium concentrations at reaction conditions and consist primarily of hydrogen, carbon monoxide, carbon dioxide, methane and steam. It has been proposed to utilize steam gasification in the presence of a carbon-alkali metal catalyst to produce a high Btu product gas by treating the raw product gas for the removal of steam and acid gases, principally carbon dioxide and hydrogen sulfide; cryogenically separating carbon monoxide and hydrogen in amounts equivalent to their equilibrium concentration in the raw product gas from the methane in the treated gas; withdrawing methane as a high Btu product gas; and recycling the carbon monoxide and hydrogen to the gasifier. The presence in the gasifier of the carbon-alkali metal catalyst and equilibrium quantities of recycle carbon monoxide and hydrogen, which tend to suppress reactions that would otherwise produce additional hydrogen and carbon dioxide, results in a substantially thermoneutral reaction to produce essentially methane and carbon dioxide. Since the overall reaction is substantially thermoneutral, only a small heat input is required to preheat the carbonaceous feed material and to maintain the reactants at reaction temperatures by compensating for heat losses from the gasifier. This small amount of heat may be supplied by preheating the gaseous reactants in a conventional preheat furnace.

Although the above-described process permits the production of a high Btu product gas from a carbonaceous feed material without the necessity for separate downstream shifting and methanation steps and thereby significantly reduces the cost of preparing pipeline quality gas from coal and other carbonaceous materials, it does require the use of the relatively expensive steps of cryogenic separation and preheating, both of which result in a high consumption of energy. Therefore, in situations where the production of a high Btu, pipeline quality gas is not necessary, it may be desirable to utilize a thermoneutral process for the gasification of a carbonaceous material in the presence of a carbon-alkali metal catalyst and added hydrogen and carbon monoxide that does not utilize a cryogenic separation and a preheat step.

SUMMARY OF THE INVENTION

This invention provides a substantially thermoneutral process for the generation of an intermediate Btu gas by the reaction of steam with coal, petroleum coke, heavy oil and other carbonaceous feed materials in the presence of a carbon-alkali metal catalyst and added hydrogen and carbon monoxide which requires a substantially lower initial investment, is less expensive to operate, and is more energy efficient than the process outlined above and other processes for production of gaseous fuels from coal and similar carbonaceous materials. In accordance with the invention, it has now been found that an intermediate Btu gas can be generated by reacting steam with a carbonaceous feed material in the presence of a carbon-alkali metal catalyst and substantially equilibrium quantities of added hydrogen and carbon monoxide at a temperature between about 1000° F. and about 1500° F. and a pressure in excess of about 100 psia, preferably between about 300 and about 1500 psia, to produce a raw product gas consisting essentially of equilibrium quantities, at reaction temperature and pressure, of methane, carbon monoxide, carbon dioxide, steam and hydrogen; withdrawing the raw product gas from the reaction zone and treating it for the removal of acid gases to produce a treated gas; withdrawing a portion of the treated gas as an intermediate Btu product gas; contacting the remainder of the treated gas with steam in a steam reforming zone under conditions such that the methane in the gas reacts with steam to produce additional amounts of carbon monoxide and hydrogen; and passing the effluent from the reforming zone into the reaction zone.

The size of the treated gas stream passed to the reforming zone is determined in part by the methane content of the treated gas. Sufficient methane should normally be present in the stream to produce enough carbon monoxide and hydrogen in the reforming zone to compensate for the amount of those gases removed in the treated gas that is withdrawn as intermediate Btu product gas. Thus the reforming zone effluent will normally contain carbon monoxide and hydrogen in amounts equivalent to the equilibrium quantities of those gases present in the raw product gas and will therefore supply the substantially equilibrium quantities of hydrogen and carbon monoxide required in the reaction zone along with the carbon-alkali metal catalyst and steam to produce the thermoneutral reaction that results in the formation of essentially methane and carbon dioxide.

A sufficient amount of steam is normally mixed with the treated gas fed to the reforming zone so that enough unreacted steam is present in the steam reforming zone effluent to provide substantially all of the steam necessary to supply the reactions taking place in the reaction zone. The effluent from the reforming zone may also be used to supply the sensible heat needed to preheat the carbonaceous feed material to reaction temperature and compensate for heat losses from the reaction zone. This is achieved by operating the reforming zone under conditions such that the effluent is maintained at a temperature between about 100° F. and about 250° F. higher than the temperature in the reaction zone and passing the effluent without substantial cooling into the reaction zone.

The process of the invention is one for the conversion of a carbonaceous material into a gaseous fuel that is less expensive and more energy efficient than processes utilized or proposed in the past. The process utilizes the reaction of steam with carbon in the presence of a carbon-alkali metal catalyst and substantially equilibrium amounts of added hydrogen and carbon monoxide to produce a substantially thermoneutral reaction that results in the formation of essentially methane and carbon dioxide in the reaction zone. The process, unlike a similar process proposed in the past, does not require the use of expensive, energy consuming cryogenic separation and preheat steps and produces an intermediate Btu gas that has wide-spread application as an industrial fuel gas.

BRIEF DESCRIPTION OF THE DRAWING

The drawing is a schematic flow diagram of a process carried out in accordance with the invention for the manufacture of an intermediate Btu gas by the gasification of coal or similar carbonaceous solids with steam in the presence of a carbon-alkali metal catalyst and equilibrium quantities of hydrogen and carbon monoxide.

DESCRIPTION OF THE PREFERRED EMBODIMENTS

The process depicted in the drawing is one for the production of an intermediate Btu gas by the gasification of bituminous coal, subbituminous coal, lignite, coal char, coke or similar carbonaceous solids with steam at a high temperature in the presence of a carbon-alkali metal catalyst prepared by impregnating the feed solids with a solution of an alkali metal compound or mixture of such compounds and thereafter heating the impregnated material to a temperature sufficient to produce an interaction between the alkali metal and the carbon present. The solid feed material that has been crushed to a particle size of about 8 mesh or smaller on the U.S. Sieve Series Scale is passed into line 10 from a feed preparation plant or storage facility that is not known in the drawing. The solids introduced into line 10 are fed into a hopper or similar vessel 11 from which they are passed through line 12 into feed preparation zone 14. This zone contains a screw conveyor or similar device 15 that is powered by a motor 16, a series of spray nozzles or similar devices 17 for the spraying of an alkali metal-containing solution supplied through line 18 onto the solids as they are moved through the preparation zone by the conveyor, and a similar set of nozzles or the like 19 for the introduction of steam into the preparation zone. The steam, supplied through line 20, serves to heat the impregnated solids and drive off the moisture. Steam is withdrawn from zone 14 through line 21 and passed to a condenser, not shown, from which is may be recovered for use as makeup water or the like. The majority of the alkali metal-containing solution is recycled through line 49 from the alkali metal recovery portion of the process, which is described hereafter. Any makeup alkali metal solution required may be introduced into line 18 via line 13.

It is preferred that sufficient alkali metal-containing solution be introduced into preparation zone 14 to provide from about 1 to about 50 weight percent of an alkali metal compound or mixture of such compounds on the coal or other carbonaceous solids. From about 5 to about 30 percent is generally adequate. The dried impregnated solid particles prepared in zone 14 are withdrawn through line 24 and passed to a closed hopper or similar vessel 25 from which they are discharged through a star wheel feeder or equivalent device 26 in line 27 at an elevated pressure sufficient to permit their entrainment into a stream of high pressure steam, recycle product gas, inert gas or other carrier gas introduced into line 29 via line 28. The carrier gas and entrained solids are passed through line 29 into manifold 30 and fed from the manifold through feed lines 31 and nozzles, not shown in the drawing, into gasifier 32. In lieu of or in addition to hopper 25 and star wheel feeder 26, the feed system may employ parallel lock hoppers, pressurized hoppers, aerated standpipes operated in series, or other apparatus to raise the input feed solids stream to the required pressure level.

It is generally preferred to operate the gasifier 32 at a pressure between about 300 and 1500 psia. The carrier gas and entrained solids will normally be introduced at a pressure somewhat in excess of the gasifier operating pressure. The carrier gas may be preheated to a temperature in excess of about 300° F. but below the initial softening point of the coal or other feed material employed. Feed particles may be suspended in the carrier gas in a concentration between about 0.2 and about 5.0 pounds of solid feed material per pound of carrier gas. The optimum ratio for a particular system will depend in part upon the particle size and density, the molecular weight of the gas employed, the temperature of the solid feed material and the input gas stream, the amount of alkali metal compound employed and other factors. In general, ratios between about 0.5 and about 4.0 pounds of solid feed material per pound of carrier gas are preferred.

Gasifier 32 contains a fluidized bed of carbonaceous solids extending upward within the vessel above an internal grid or similar distribution device not shown in the drawing. The bed is maintained in the fluidized state by means of steam, hydrogen and carbon monoxide introduced through line 33, manifold 34 and peripherally spaced injection lines and nozzles 35 and through bottom inlet line 36. The particular injection system shown in the drawing is not critical and hence other methods for injecting the steam, hydrogen and carbon monoxide may be employed. In some instances, for example, it may be preferred to introduce the gases through multiple nozzles to obtain more uniform distribution of the injected fluid and reduce the possibility of channeling and related problems. The space velocity of the rising gases within the fluidized bed will normally be between about 15 and about 300 actual volumes of steam, hydrogen and carbon monoxide per hour per volume of fluidized solids.

Within the fluidized bed is gasifier 32, the carbonaceous solids impregnated with the alkali metal compound or mixture of such compounds are subjected to a temperature within the range between about 1000° F. and about 1500° F., preferably between about 1200° F. and 1400° F. At such a temperature the alkali metal constituents interact with the carbon in the carbonaceous solids to form a carbon-alkali metal catalyst, which will under proper reaction conditions equilibrate the gas phase reactions occurring during gasification to produce additional methane and at the same time supply substantial amounts of additional exothermic heat in situ. Due to the gas phase equilibrium conditions existing as a result of the carbon-alkali metal catalyst and due to the presence of equilibrium quantities of hydrogen and carbon monoxide injected with the steam near the lower end of the bed, the reaction products will normally consist essentially of methane and carbon dioxide. Competing reactions that in the absence of the catalyst and the hydrogen and carbon monoxide would ordinarily tend to produce additional hydrogen and carbon monoxide are suppressed. At the same time, substantial quantities of exothermic heat are released as a result of the reaction of hydrogen with carbon oxides and the reaction of carbon monoxide with steam. This exothermic heat tends to balance the endothermic heat consumed by the reaction of the steam with carbon, thereby producing a thermoneutral reaction. So far as the heat of reaction is concerned, the gasifier is therefore largely in heat balance. The heat employed to preheat the feed coal to the reaction temperature and compensate for heat losses from the gasifier is supplied for the most part by excess heat in the steam, hydrogen and carbon monoxide. In the absence of the exothermic heat provided by the catalyzed gas phase reactions, the steam, hydrogen and carbon monoxide would have to be heated to substantially higher temperatures than those employed here.

The carbon-alkali metal catalyst utilized in the process described above is prepared by impregnating the carbonaceous feed material with an alkali metal-containing solution and then subjecting the impregnated solids to a temperature above 800° F. in the gasifier itself. It will be understood that the alkali metal catalyst utilized in the process of this invention can be prepared without impregnation onto the carbonaceous solid to be gasified, and without heating in the gasifier. The heating step, for example, may be carried out in a solid feed preparation zone or in an external heater. The carbonaceous solids used will in most instances be the ones which are to be gasified but in some variations of the process carbonaceous materials other than the feed solids may be used. In some cases inert carriers having carbon deposited on their outer surface may be used. Suitable inert carriers include silica, alumina, silica-alumina, zeolites, and the like. The catalyst particles, whether composed substantially of carbon and an alkali metal constituent or made up of carbon and an alkali metal constituent deposited on an inert carrier, may range from fine powders to coarse lumps, particles between about 4 and about 100 mesh on the U.S. Sieve Series Scale generally being preferred. The size selected for use in a particular operation will normally depend in part on the gas velocities and other conditions within the system in which the catalyst is to be used. In fluidized bed systems, the particle size is in part dependent upon the conditions under which the bed is to be operated. In fixed or moving bed systems, the catalyst particle size is generally of less importance.

Any of a variety of alkali metal constituents can be used in preparing the carbon-alkali metal catalyst. Suitable constituents include the alkali metals themselves and alkali metal compounds such as alkali metal carbonates, bicarbonates, formates, biphosphates, oxalates, aluminates, amides, hydroxides, acetates, sulfates, hydrosulfates, sulfides, tungstates, and mixtures of these and other similar compounds. All of these are not equally effective and hence a catalyst prepared from certain alkali metal constituents can be expected to give somewhat better results under certain conditions than do others. In general, cesium, potassium, sodium and lithium salts derived from organic or inorganic acids having ionization constants less than about $1 \times 10^{-3}$ and alkali metal hydroxides are preferred. The cesium compounds are the most effective, followed by the potassium, sodium and lithium compounds in that order. Because of their high activity, relatively low cost compared to cesium compounds, and ready availability, potassium compounds or mixtures of potassium and sodium compounds are generally employed. Potassium carbonate or mixtures of potassium carbonate and sodium carbonate are especially effective.

In the embodiment of the invention shown in the drawing, the alkali metal constituent and the carbonaceous solid are combined to form an intimate mixture by dissolving a water soluble alkali metal compound in an aqueous carrier, impregnating the carbonaceous solid with the resulting aqueous solution by soaking or spraying the solution onto the particles, and thereafter drying the solids. It will be understood that other methods of forming such an intimate mixture may be used. For example, in some cases the carbonaceous material can be impregnated by suspending a finely divided alkali metal or alkali metal compound in a hydrocarbon solvent or other inert liquid carrier of suitably low viscosity and high volatility and thereafter treating the solid with the liquid containing the alkali metal constituent. In other cases, it may be advantageous to pelletize a very finely divided alkali metal or alkali metal compound with carbon in an oil or similar binder and then heat the pellets to an elevated temperature. Other catalyst preparation methods, including simply mixing finely divided carbonaceous material with a powdered alkali metal salt and thereafter heating the mixture to the desired temperature, can in some cases also be used.

The mechanisms which take place as the result of combining the carbonaceous solids and alkali metal constituents and then heating them to elevated temperatures are not fully understood. One possible explanation is that the alkali metal reacts with the carbon to form interlamellar carbon-alkali metal compounds and complexes. Studies have shown that neither carbonaceous solids nor the alkali metal constituents alone are fully effective for establishing equilibrium conditions for gas phase reactions involving steam, hydrogen, carbon monoxide, carbon dioxide and methane and that catalytic activity is obtained only when a compound or complex of the carbon and alkali metal is present in the system. Both constituents of the catalyst are therefore necessary. Experience has shown that these catalysts are resistent to degradation in the presence of sulfur compounds, that they resist sintering at high temperatures, and that they bring gas phase reactions involving the gases normally produced during coal gasification into equilibrium. As a result of these and other beneficial properties, these catalysts have pronounced advantages over other catalysts employed in the past.

Referring again to the drawing, the gas leaving the fluidized bed in gasifier 32 passes through the upper section of the gasifier, which serves as a disengagement zone where particles too heavy to be entrained by the gas leaving the vessel are returned to the bed. If desired, this disengagement zone may include one or more cyclone separators or the like for removing relatively large particles from the gas. The gas withdrawn from the upper part of the gasifier through line 37 will normally contain an equilibrium mixture at reaction temperature and pressure of methane, carbon dioxide, hydrogen, carbon monoxide, and unreacted steam. Also present in this gas are hydrogen sulfide, ammonia and other contaminants formed from the sulfur and nitrogen contained in the feed material, and entrained fines. This raw product gas is introduced into cyclone separator or similar device 38 for removal of the larger fines. The overhead gas then passes through line 39 into a second separator 41 where smaller particles are removed. The gas from which the solids have been separated is taken overhead from separator 41 through line 42 and the fines are discharged downward through dip legs 40 and 43. These fines may be returned to the gasifier or passed to the alkali metal recovery portion of the process.

In the system shown in the drawing, a stream of high ash content char particles is withdrawn through line 44 from gasifier 32 in order to control the ash content of the system and permit the recovery and recycle of alkali metal constituents of the catalyst. The solids in line 44, which may be combined with fines recovered from the gasifier overhead gas through dip legs 40 and 43 and line 45, are passed to alkali metal recovery unit 46. The recovery unit will normally comprise a multistage countercurrent leaching system in which the high ash content particles are counter-currently contacted with water or a dilute solution of formic acid or the like introduced through line 47. An aqueous solution of alkali metal compounds is withdrawn from the unit through line 48 and recycled through lines 49 and 18 to feed preparation zone 14. Ash residues from which substantially all of the soluble alkali metal compounds have been leached are withdrawn from the recovery unit through line 50 and may be disposed of as land fill or further treated to recover added alkali metal constituents.

The gas leaving separator 41 is passed through line 42 to gas-gas heat exchanger 51 where it is cooled by indirect heat exchange with an intermediate Btu gas recycled through line 72. The cooled gas is then passed through line 53 into waste heat boiler 54 where it is further cooled by indirect heat exchange with water introduced through line 55. Sufficient heat is transferred from the gas to the water to convert it into steam, which is withdrawn through line 56. During this cooling step, unreacted steam in the gas from exchanger 51 is condensed out and withdrawn as condensate through line 57. The cool gas exiting waste heat boiler 54 through line 58 is passed to water scrubber 59. Here the gas stream passes upward through the scrubber where it comes in contact with water injected into the top of the scrubber through line 60. The water absorbs ammonia and a portion of the hydrogen sulfide in the gas stream and is withdrawn from the bottom of the scrubber through line 61 and passed to downstream units for further processing. The water scrubbed gas stream is withdrawn from the scrubber through line 62 and is now ready for treatment to remove bulk amounts of hydrogen sulfide and other acid gases.

The gas stream is passed from water scrubber 59 through line 62 into the bottom of solvent scrubber 63. Here the gas passes upward through the contacting zone in the scrubber where it comes in contact with a downflowing stream of solvent such as monoethanolamine, diethanolamine, a solution of sodium salts of amino acids, methanol, hot potassium carbonate or the like introduced into the upper part of the solvent scrubber through line 64. If desired, the solvent scrubber may be provided with spray nozzles, perforated plates, bubble cap plates, packing or other means for promoting intimate contact between the gas and the solvent. As the gas rises through the contacting zone, hydrogen sulfide, carbon dioxide and other acid gases are absorbed by the solvent, which exits the scrubber through line 65. The spent solvent containing carbon dioxide, hydrogen sulfide and other contaminants is passed through line 65 to a stripper, not shown in the drawing, where it is contacted with steam or other stripping gas to remove the absorbed contaminants and thereby regenerate the solvent. The regenerated solvent may then be reused by injecting it back into the top of the scrubber via line 64.

A clean gas containing essentially methane, hydrogen, and carbon monoxide in amounts equivalent to the equilibrium quantities of those gases in the raw product gas withdrawn from gasifier 32 through line 37 is withdrawn overhead from the solvent scrubber via line 66. In some cases it may be desirable to operate the solvent scrubber under conditions such that some carbon dioxide is also present in the overhead gas stream. The methane content of the gas will normally range between about 20 and about 60 mole percent and the gas will be of an intermediate Btu heating value, normally containing between about 400 and about 750 Btu's per standard cubic foot. A portion of this gas is recovered via line 75 as an intermediate Btu product gas, which may be subsequently used as a fuel to supply the heat requirements of other industrial plants or for other purposes.

The portion of the intermediate Btu gas that is not recovered as product is passed through line 67 to compressor 68 where its pressure is increased to a value from about 25 psi to about 75 psi above the operating pressure in gasifier 32. The pressurized gas is withdrawn from compressor 68 through line 69 and passed through tubes 70 located in the stack of steam reforming furnace 71. Here the high pressure gas picks up heat via indirect heat exchange with the hot flue gases generated in the furnace. The gas is removed from the tubes 70 through line 72 and mixed with steam, generated in waste heat boiler 54, injected into line 72 via line 56. The mixture of intermediate Btu gas and steam is then passed through line 72 into gas-gas heat exchanger 51 where it is heated by indirect heat exchange with the raw product gas removed from separator 41. The heated mixture is removed from exchanger 51 and passed through line 73 to steam reforming furnace 71.

The preheated mixture of steam and intermediate Btu gas in line 73 will normally consist essentially of carbon monoxide, hydrogen, steam and methane. The mixture is introduced into the internal tubes 74 of steam reforming furnace 71 where the intermediate Btu gas and the steam react with one another in the presence of a conventional steam reforming catalyst. The catalyst will normally consist of metallic constituents supported on an inert carrier. The metallic constituent will normally be selected from Group VI-B and the iron group of the Periodic Table and may be chromium, molybdenum, tungsten, nickel, iron, and cobalt and may include small amounts of potassium carbonate or a similar compound as a promoter. Suitable inert carriers include silica, alumina, silica-alumina, zeolites, and the like. The particular furnace shown in the drawing includes tubes 70 for preheating the high pressure intermediate Btu gas withdrawn from compressor 68 through line 69.

The reforming furnace is operated under conditions such that methane in the intermediate Btu gas will react with steam in the tubes 74 to produce additional hydrogen and carbon monoxide according to the following equation: $H_2O + CH_4 \rightarrow 3H_2 + CO$. The temperature in the reforming furnace will normally be maintained between about 1200° F. and about 1800° F., preferably between about 100° F. and about 250° F. above the temperature in gasifier 32. The pressure will range between about 10 and about 30 psi above the pressure in the gasifier. The ratio of steam to intermediate Btu gas introduced into the reactor will range between about 2.0 and about 4.0 or higher but will preferably range between about 2.5 and about 3.5. The reforming furnace is preferably fired by a portion of the intermediate Btu gas removed from the process as product via line 75. The required amount of gas is withdrawn from line 75 through line 76 and passed directly to the fire box in the steam reforming furnace.

The gaseous effluent stream from the steam reforming furnace, which is normally a mixture consisting essentially of hydrogen, carbon monoxide and unreacted steam is passed, preferably without substantial cooling, through lines 77, 36 and 33 into gasifier 32. This stream is the primary source of the hydrogen, carbon monoxide and steam required in the gasifier in addition to the carbon-alkali metal catalyst to produce the thermoneutral reaction that results in the formation of essentially carbon dioxide and methane. It is therefore desirable that the reforming furnace effluent contain sufficient carbon monoxide and hydrogen to supply the substantially equilibrium quantities of those gases required in the gasifier and sufficient unreacted steam to provide substantially all of the steam required by the reactions taking place in the gasifier. To supply the desired amounts of hydrogen and carbon monoxide in the effluent, sufficient methane should normally be present in the feed to the reforming furnace so that enough carbon monoxide and hydrogen is produced by steam reforming the methane to compensate for the amount of hydrogen and carbon monoxide removed in the intermediate Btu product gas withdrawn through line 75. This may be accomplished by adjusting the size and therefore the methane content of the gas stream fed to the furnace from its point of origin in line 67. If the amount of steam added via line 56 to the reforming furnace feed stream in line 72 is not sufficiently in excess of the amount consumed in the furnace so as to provide the desired quantity of unreacted steam in the reformer effluent, additional steam may be injected into line 72 through line 78.

For purposes of thermal efficiency, it is preferable that the steam reforming step of the process be utilized in such a manner as to obviate the need for a separate preheat step. This may be accomplished by adjusting the firing rate of the reforming furnace so that the effluent is at a temperature sufficiently high, normally from about 100° F. to about 250° F. higher than the operating temperature in the gasifier, to preheat the carbonaceous feed material to reaction temperature and maintain all of the reactants at such temperature by conpensating for heat losses during gasification. In this regard it is important that the effluent from the steam reforming furnace be passed to the gasifier in such a manner as to avoid substantial cooling.

It will be apparent from the foregoing that the invention provides an improved process for the steam gasification of a carbonaceous material in the presence of a carbon-alkali metal catalyst and substantially equilibrium quantities of added hydrogen and carbon monoxide that is less complex, more energy efficient and less expensive than similar processes proposed in the past.

We claim:

1. A process for the production of an intermediate Btu gas from a carbonaceous feed material and steam which comprises:
    (a) reacting said steam with said carbonaceous feed material in a reaction zone at a reaction temperature between about 1000° F. and about 1500° F. and at a reaction pressure in excess of about 100 psia, in the presence of a carbon-alkali metal catalyst and sufficient added hydrogen and carbon monoxide to provide substantially equilibrium quantities of hydrogen and carbon monoxide in said reaction zone at said reaction temperature and said reaction pressure;
    (b) withdrawing from said reaction zone a raw product gas containing substantially equilibrium quantities, at said reaction temperature and pressure of methane, carbon dioxide, steam, hydrogen and carbon monoxide;
(c) treating said raw product gas for the removal of acid gases;
(d) recovering a portion of the treated gas as said intermediate Btu product gas;
(e) contacting the remainder of said treated gas with steam in a steam reforming zone under conditions such that the methane in said treated gas reacts with said steam to produce additional hydrogen and carbon monoxide; and
(f) passing the effluent containing hydrogen, carbon monoxide and unreacted steam without substantial cooling from said steam reforming zone into said reaction zone, thereby supplying said added hydrogen and carbon monoxide required in said reaction zone and wherein said reforming zone is operated at conditions such that the heat content of said effluent from said reforming zone is sufficient to supply substantially all of the sensible heat needed to preheat said carbonaceous feed material to said reaction temperature.

2. A process as defined by claim 1 wherein said carbonaceous feed material comprises coal.

3. A process as defined by claim 2 wherein said carbon-alkali metal catalyst is prepared by treating said coal with an alkali metal compound and thereafter heating the treated coal to said reaction temperature in said reaction zone.

4. A process as defined by claim 1 wherein said intermediate Btu product gas has a heat content in the range from about 400 to about 750 Btu's per standard cubic foot.

5. A process as defined by claim 1 wherein said reaction temperature is between about 1200° F. and about 1400° F.

6. A process as defined by claim 1 wherein said reaction pressure is between about 300 and about 1500 psia.

7. A process as defined by claim 1 wherein said treated gas contacted with steam in said steam reforming zone contains sufficient methane to produce enough additional hydrogen and carbon monoxide in said steam reforming zone so that the effluent from said zone will contain sufficient carbon monoxide and hydrogen to provide equilibrium quantities of those gases in said reaction zone.

8. A process as defined by claim 1 wherein sufficient steam is contacted with said treated gas in said steam reforming zone so that the effluent from said zone will contain enough unreacted steam to supply substantially all of the steam required in said reaction zone.

9. A process for the production of an intermediate Btu product gas from coal and steam which comprises:
(a) gasifying said coal with said steam in a catalytic gasification zone at a reaction temperature between about 1000° F. and about 1500° F. and at a reaction pressure between about 300 psia and about 1500 psia, in the presence of a carbon-alkali metal catalyst comprising a high temperature carbon-alkali metal reaction product, and in the presence of sufficient added hydrogen and carbon monoxide to provide substantially equilibrium quantities of hydrogen and carbon monoxide in said catalytic gasification zone at said reaction temperature and said reaction pressure;
(b) withdrawing from said catalytic gasification zone a raw product gas containing substantially equilibrium quantities, at said reaction temperature and pressure, of methane, carbon dioxide, steam, hydrogen and carbon monoxide;
(c) treating said raw product gas for the removal of acid gases;
(d) recovering a portion of the treated gas as said intermediate Btu product gas;
(e) contacting the remainder of said treated gas with excess steam in a steam reforming zone under conditions such that the methane in said treated gas reacts with a portion of said excess steam to produce additional hydrogen and carbon monoxide so that the effluent from said steam reforming zone will contain said added hydrogen and carbon monoxide required in said catalytic gasification zone, said excess steam being present in such a quantity that said effluent will also contain enough unreacted steam to supply substantially all of the steam requirements in said catalytic gasification zone, said steam reforming zone being operated at conditions such that the heat content of said effluent is sufficient to supply substantially all of the sensible heat needed to preheat said coal to said reaction temperature; and
(f) passing said effluent without substantial cooling from said steam reforming zone into said catalytic gasification zone.

10. A process as defined by claim 9 wherein the temperature of said effluent from said steam reforming zone is between about 100° F. and about 250° F. higher than said reaction temperature in said catalytic gasification zone.

11. A process as defined by claim 9 wherein said coal is impregnated with an aqueous solution of a potassium compound and dried prior to introduction of said coal into said catalytic gasification zone.

12. A process as defined by claim 11 wherein said aqueous solution comprises alkali metal compounds recovered from char withdrawn from said catalytic gasification zone.

13. A process as defined by claim 9 wherein said treated gas contacted with said excess steam in said steam reforming zone contains sufficient methane to produce enough additional hydrogen and carbon monoxide so that said effluent from said steam reforming zone will contain sufficient carbon monoxide and hydrogen to provide equilibrium quantities of those gases in said catalytic gasification zone.

* * * * *